(12) United States Patent
Tanaka et al.

(10) Patent No.: US 8,794,843 B2
(45) Date of Patent: Aug. 5, 2014

(54) ROTATION SUPPORT DEVICE FOR PINION SHAFT

(71) Applicant: NSK Ltd., Tokyo (JP)

(72) Inventors: Takanori Tanaka, Fujisawa (JP); Tomoharu Saito, Fujisawa (JP); Yasushi Tanoue, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/777,380

(22) Filed: Feb. 26, 2013

(65) Prior Publication Data

US 2013/0182986 A1    Jul. 18, 2013

Related U.S. Application Data

(63) Continuation of application No. 13/510,826, filed as application No. PCT/JP2010/070721 on Nov. 19, 2010.

(30) Foreign Application Priority Data

Nov. 19, 2009  (JP) .................................. 2009-263553
Nov. 12, 2010  (JP) .................................. 2010-253709

(51) Int. Cl.
*F16C 33/58*    (2006.01)
*F16C 19/18*    (2006.01)

(52) U.S. Cl.
USPC .......................... 384/513; 384/516; 384/512

(58) Field of Classification Search
CPC ...... F16C 33/58; F16C 19/163; F16C 19/505; F16C 2240/34; F16C 2361/61; F16H 57/02004

USPC .......................... 384/513, 515, 516, 504, 512
See application file for complete search history.

(56) References Cited

U.S. PATENT DOCUMENTS

2005/0232524 A1    10/2005  Fukuda et al.
2007/0172166 A1     7/2007  Kawaguchi et al.
2009/0220183 A1*    9/2009  Meeker et al. ................ 384/544

FOREIGN PATENT DOCUMENTS

| EP | 1 403 539 A1 | 3/2004 |
|----|--------------|--------|
| EP | 1 498 621 A1 | 1/2005 |
| EP | 1 719 926 A1 | 11/2006 |
| JP | 11-48805 A   | 2/1999 |
| JP | 2003-314541 A | 11/2003 |
| JP | 2004-169890 A | 6/2004 |

(Continued)

OTHER PUBLICATIONS

International Search Report dated Dec. 28, 2010 with English translation (four (4) pages).

(Continued)

*Primary Examiner* — Thomas R Hannon
(74) *Attorney, Agent, or Firm* — Crowell & Moring LLP

(57) ABSTRACT

A rotation support device for a pinion shaft is configured such that, together with being able to sufficiently maintain axial rigidity of a rolling bearing on the side opposite from the pinion gear side, it is able to sufficiently reduce the dynamic torque during operation and the starting torque at the start of operation. Together with using a single-row angular contact ball bearing as the rolling bearing on the side opposite from the pinion gear side, the ratio of the radius of curvature Ro of the outer raceway and the diameter Bd of the balls (Ro/Bd) is regulated within the range $0.52 < Ro/Bd \leq 0.56$, and the contact angle $\alpha$ is regulated within the range of 35° to 40°.

4 Claims, 8 Drawing Sheets

(56) References Cited

FOREIGN PATENT DOCUMENTS

| | | |
|---|---|---|
| JP | 2004-183745 A | 7/2004 |
| JP | 2005-233406 A | 9/2005 |
| JP | 4058241 B2 | 3/2008 |
| JP | 2009-24845 A | 2/2009 |
| JP | 4250952 B2 | 4/2009 |

OTHER PUBLICATIONS

Mechanical English translation of JP 4250952 B2.
Mechanical English translation of JP 4058241 B2.
Mechanical English translation of JP 2003-314541 A.
Mechanical English translation of JP 2005-233406 A.
Mechanical English translation of JP 2009-248845 A.
Mechanical English transaltion of JP 2004-183745 A.

\* cited by examiner

ROTATION SUPPORT DEVICE FOR PINION SHAFT

CROSS REFERENCE TO RELATED APPLICATIONS

This application is a continuation of co-pending application Ser. No. 13/510,826, which is the U.S. national stage of International patent application no. PCT/JP2010/070721, filed Nov. 19, 2010 designating the United States of America. Priority is claimed based on Japanese patent application no. 2009-263553 filed Nov. 19, 2009 and Japanese patent application no. 2010-253709 filed Nov. 12, 2010, the entire disclosures of which are herein expressly incorporated by reference.

TECHNICAL FIELD

The present invention relates to a rotation support device for a pinion shaft which constitutes a part of a differential device of an automobile or a transfer case for a four-wheel drive vehicle.

BACKGROUND ART

The differential device of an automobile or the transfer case of a four-wheel drive vehicle normally comprises a pinion shaft with a pinion gear provided on one end section, and this pinion shaft is supported inside a housing by way of a pair of rolling bearings that are separated from each other in the axial direction so as to be able to rotate freely and so as to be able to support axial loads in both directions.

FIG. 9 illustrates a differential device in which a first example of a rotation support device for a pinion shaft having conventional construction is assembled as disclosed in JP 11-048805(A). A differential device is located in the middle of a power transmission line of an automobile so as to reduce the speed of rotation of the propeller shaft as well as to convert the direction of rotation orthogonally. In this differential device, a pair of ring-shaped walls 2a, 2b are located in the portion near the front of the inside of the case 1, which is the housing, such that they are separated in the front/rear direction, and the pinion shaft 3 is supported on the inside of both of these ring-shaped walls 2a, 2b by a pair of single-row tapered roller bearings 4a, 4b so as to be able to rotate freely and be able to support axial loads in both directions. The single-row tapered roller bearings 4a, 4b are constructed such that a plurality of tapered rollers 7a, 7b are located between outer rings (cups) 5a, 5b that fit around the inside of the ring-shaped walls 2a, 2b and inner rings (cones) 6a, 6b that fit around the outside of the pinion shaft 3 so as to be able to roll freely. These single-row tapered roller bearings 4a, 4b are arranged in a back-to-back such that the directions of the contact angles are opposite from each other, so as to support axial loads that are applied to the pinion shaft 3 in both directions (both the left and right direction in FIG. 9). The front/rear relationship in this specification is defined as the front and rear of the vehicle. That is, in FIG. 9, the right side is the "front side", and the left side is the "rear side".

A ring-shaped connecting member 8 is fastened around the outside on the front end section of the pinion shaft 3. A connecting flange 9 that constitutes a front end section of this connecting member 8 is located on the portion that protrudes toward the outside from the opening section on the front end of the case 1. The rear end section of the propeller shaft (not illustrated in the figure) is connected to the connecting flange 9. On the other hand, a pinion gear 10 is fastened to the rear end section of the pinion shaft 3, and the pinion gear 10 and a ring gear 11 engage together. The ring gear 11 is supported in the rear section on the inside of the case 1 so as to only be able to rotate freely.

In recent years, there is a strong demand for energy conserving automobiles, so for a pair of rolling bearings that are assembled in a differential device or transfer case such as described above as well, there is a demand to reduce to the dynamic torque (rotation resistance) and starting torque in order to keep the amount of power transmission loss low. The first example of conventional construction is not always able to sufficiently reduce these kinds of torque, and thus is not able to meet this demand.

In other words, in the first example of conventional construction, single-row tapered roller bearings 4a, 4b are used as the pair of rolling bearings assembled in the rotation support device for the pinion shaft. In both of these single-row tapered roller bearings 4a, 4b, in addition to the outer rings 5a, 5b and the inner races 6a, 6b coming in rolling contact with the tapered rollers 7a, 7b, a rib section 12 that exists on the end section on the large-diameter side of the outer circumferential surface of the inner ring 6a, 6b and the head sections of the tapered rollers 7a, 7b (surfaces on the ends on large diameter sides) are always in sliding contact, so it becomes easy for the torque to become large.

JP 4,250,952(B2) discloses construction where by devising the construction of the pair of rolling bearings that are assembled in the rotation support device for a pinion shaft, the torque in both of these rolling bearings is kept small. FIG. 10 illustrates a second example of conventional construction of a rotation support device for a pinion shaft which is disclosed in JP 4,250,952(B2). In this second example of conventional construction, a tandem double-row angular contact ball bearing 13 is used as the rolling bearing on the pinion gear side (left side in FIG. 10) that supports a comparatively large radial load. This tandem double-row angular contact ball bearing 13 is able to support an axial load that acts on the pinion shaft 3 in a direction toward the side opposite the pinion gear from the pinion gear side. On the other hand, a single-row angular contact ball bearing 14 is used as the rolling bearing on the opposite side from the pinion gear side (right side in FIG. 10) that supports a comparatively small radial load. This single-row angular contact ball bearing 14 is able to support an axial load that acts on the pinion shaft 3 in a direction toward the pinion gear side from the side opposite from the pinion gear side.

The tandem double-row angular contact ball bearing 13 that is located on the pinion gear side is constructed by arranging a plurality of balls 19 for each row between the angular double-row outer raceways 16a, 16b that are formed around the inner circumferential surface of the outer ring 15 and the angular double-row inner raceways 18a, 18b that are formed around the outer circumferential surface of the inner ring 17 so that contact angles are applied in the same direction by both rows of balls 20a, 20b, and so that the pitch circle diameter of the ball row 20a on the pinion gear side is greater than the pitch circle diameter of the ball row 20b on the side opposite from the pinion gear side. On the other hand, the single-row angular contact ball bearing 14 that is located on the side opposite from the pinion gear side is constructed by arranging a plurality of balls 25 between the angular outer raceway 22 that is formed around the inner circumferential surface of the outer ring 21 and the angular inner raceway 24 that is formed around the outer circumferential surface of the inner ring 23, so that these balls 25 can roll freely when a contact angle given.

Moreover, in the case of a second example of conventional construction, the diameter of the balls 25 of the ball row of the single-row angular contact ball bearing 14 that is located on the opposite side from the pinion gear side is larger than the diameter of the balls 19 of the ball rows 20a, 20b of the tandem double-row angular contact ball bearing 13 that is located on the pinion gear side, so it is possible to sufficiently support axial loads from both directions. In other words, when the diameter of the balls 19 is taken to be $Bd_{19}$, and the diameter of the balls 25 is taken to be $Bd_{25}$, $Bd_{19}<Bd_{25}$. However, when necessary, it is possible to employ construction wherein the diameter of the balls 19 of the ball rows 20a, 20b of the tandem double-row angular contact ball bearing 13 is greater than the diameter of the balls 25 of the ball row of the singular angular contact ball bearing 14 ($Bd_{19}>Bd_{25}$).

In the case of the second example of conventional construction having this kind of construction, a tandem double-row angular contact ball bearing 13 and single-row angular contact ball bearing 14 are used as the pair of rolling bearings for supporting the pinion shaft 3 so as to be able to freely rotate, so, it is possible to lower the dynamic torque during operation, as well as lower the starting torque when starting operation, more than in the case of using a pair of single-row tapered roller bearings 4a, 4b as in the first example of conventional construction. However, in the case of the second example of conventional construction as well, from the aspect of being able to further lower the dynamic torque and starting torque, it cannot be said that enough investigation has been performed, and there is still room for improvement.

That is, in the second example of conventional construction, in order to prevent the occurrence of damage such as indentation of the outer raceway 22 and inner raceway 24 of the single-row angular contact ball bearing 14 that is located on the opposite side from the pinion gear side, when the radius of curvature of the cross-sectional shape of the outer raceway 22 is taken to be Ro, the radius of curvature of the cross-sectional shape of the inner raceway 24 is taken to be Ri, and the diameter of the balls 25 is taken to be Bd, the outer raceway groove R ratio, which is the ratio of the radius of curvature Ro and the diameter Bd (Ro/Bd), is regulated within the range $0.510 \leq Ro/Bd \leq 0.520$, and the inner raceway groove R ratio, which is the ratio of the radius of curvature Ri and the diameter Bd (Ri/Bd), is regulated within the range $0.502 \leq Ri/Bd \leq 0.512$. However, when the outer raceway groove R ratio and inner raceway groove R ratio are regulated within these ranges, the contact area between each of the outer raceway 22 and inner raceway 24 and the balls 25 becomes too large, and it becomes impossible to sufficiently reduce the dynamic torque during operation.

Furthermore, in this second example of conventional construction, in order to maintain the load capacity of an axial load on the single-row angular contact ball bearing 14 that is located on the opposite side from the pinion gear, when the contact angle between each of the outer raceway 22 and inner raceway 24 and the balls 25 is taken to be a, the value of this contact angle α is regulated within the range 30° to 45°. However, when the contact angle α is regulated within such a range, the value of the contact angle α becomes too small, and there is a possibility that it will become impossible to sufficiently reduce the starting torque at the start of operation.

Therefore, in the case of the second example of conventional construction, it cannot be said that enough investigation has been performed in order to be able to further reduce the dynamic torque during operation or the starting torque at the start of operation, and there is still room for improvement. In order to reduce the dynamic torque during operation, it is considered possible to increase the outer raceway groove R ratio and the inner raceway groove R ratio to values greater than in the ranges described above, however, in that case, there is a possibility that the axial rigidity of the single-row angular contact ball bearing will be insufficient, and thus there is the possibility of new problems such as noise occurring in the area of engagement between the pinion gear and the ring gear.

In addition, JP 4,058,241(B2) discloses using a tandem double-row angular contact ball bearing on both the pinion gear side and the side opposite from the pinion gear side as the pair of rolling bearings assembled in the rotation support device for a pinion shaft. In this construction, compared with the case of using a single-row angular contact ball bearing as the rolling bearing on the opposite side from the pinion gear side, it is possible to increase the load capacity, however, the dynamic torque (rotation resistance) increases, so it becomes difficult to meet the demand for lower fuel consumption of the vehicle.

RELATED LITERATURE

Patent Literature

[Patent Literature 1] JP 11-048805(A)
[Patent Literature 2] JP 4,250,952(B2)
[Patent Literature 3] JP 4,058,241(B2)

SUMMARY OF THE INVENTION

Problem to be Solved by the Invention

In consideration of the problems above, the object of the present invention is to provide construction of a rotation support device for a pinion shaft that together with being capable of sufficiently maintaining the bearing rigidity of a pair of rolling bearings for supporting the pinion shaft so as to be able to rotate freely, is able to sufficiently reduce dynamic torque during operation and starting torque at the start of operation.

Means for Solving the Problems

The rotation support device for a pinion shaft of the present invention can be used in a differential device or transfer case of a four-wheel drive vehicle and supports a pinion shaft, with a pinion gear provided on one end, inside a housing by way of a pair of rolling bearings that are separated from each other in the axial direction such that the pinion shaft can rotate freely and can support an axial load from both directions.

Particularly, in the rotation support device for a pinion shaft of the present invention, of the rolling bearings, the rolling bearing on the pinion gear side is a tandem double-row angular contact ball bearing that is capable of supporting an axial load that acts on the pinion shaft in a direction from the pinion gear side to the side opposite from the pinion gear side.

On the other hand, the rolling bearing on the side opposite from the pinion gear side is a single-row angular contact ball bearing that is capable of supporting an axial load that acts on the pinion shaft in a direction from the side opposite from the pinion gear side to the pinion gear side.

Moreover, when the radius of curvature of the outer raceway of this single-row angular contact ball bearing is taken to be Ro, the diameter of the balls is taken to be Bd, and the contact angle between the outer raceway and inner raceway and the balls is taken to be α, the relationships $0.52 < Ro/Bd \leq 0.56$ (more preferably, 0.53 or less)

and $35° \leq \alpha$ (more preferably, 45° or less)

are satisfied.

A tandem double-row angular contact ball bearing is defined as a double-row angular contact ball bearing of which the two rows are combined in parallel to each other and the pitch circle diameter (raceway diameter) of the ball row on the pinion side is greater than the pitch circle diameter (raceway diameter) of the ball row of the side opposite from the pinion gear side, with the contact angles of both rows being in the same direction.

Preferably, when the height of the groove shoulder on the load side of the inner raceway of the single-row angular contact ball bearing is taken to be h, the relationship $0.2 \leq h/Bd \leq 0.5$ is satisfied.

Moreover, preferably, of both ball rows of the tandem double-row angular contact ball bearing, the pitch circle diameter of the ball row on the pinion gear side is larger than the pitch-circle diameter of the ball row on the side opposite from the pinion gear side. Furthermore, the radial clearance of the ball row on the pinion gear side is less than the radial clearance of the ball row on the side opposite from the pinion gear side. In other words, when these radial clearances are both positive, the absolute value of the radial clearance on the pinion gear side is less than the absolute value of the radial clearance on the side opposite from the pinion gear side. In the case where the radial clearances are negative, the absolute value of the radial clearance on the pinion gear side is greater than the absolute value of the radial clearance on the side opposite from the pinion gear side. It is also possible for the radial clearance on the pinion gear side to be negative and the radial clearance on the side opposite from the pinion gear side to be positive. In this case, preferably the number of balls in the ball row on the pinion gear side is greater than the number of balls in the ball row on the side opposite from the pinion gear side.

Even more preferably, of both ball rows of the tandem double-row angular contact ball bearing, the diameter of the balls in the ball row on the pinion gear side is greater than the diameter of the balls in the ball row on the side opposite from the pinion gear side.

Effect of the Invention

In the case of the rotation support device for a pinion shaft of the present invention, having construction as described above, together with being able to sufficiently maintain the bearing rigidity of the pair of rolling bearings for supporting the pinion shaft, it is possible to sufficiently reduce the dynamic torque during operation and the starting torque at the start of operation.

In other words, in the case of the present invention, together with using a single-row angular contact ball bearing as the rolling bearing on the side opposite from the pinion gear side, the outer raceway groove R ratio (Ro/Bd) of this single-row angular contact ball bearing is regulated within the range $0.52 < Ro/Bd \leq 0.56$, so together with being able to make the contact area between the outer raceway and the rolling surface of the balls small, it is possible to prevent the amount of axial displacement from become excessively large. Therefore, it is possible to sufficiently maintain the axial rigidity and sufficiently reduce the dynamic torque during operation.

When the outer raceway groove R ratio is 0.52 or less, the contact area between the outer raceway and the rolling surface of the balls becomes too large, and it becomes impossible to sufficiently reduce the dynamic torque. On the other hand, when the outer raceway groove R ratio is greater than 0.56, the contact area between the outer raceway and the rolling surface of the balls is too small, and contact pressure becomes large, so when compared with the case when the outer raceway groove R ratio is 0.56, not only is it not possible to greatly reduce the dynamic torque, but the amount of axial displacement becomes large and it becomes difficult to maintain axial rigidity.

In the present invention, the contact angle $\alpha$ between the outer raceway and inner raceway and the balls is regulated to be 35° or greater, so it is possible to sufficiently reduce the starting torque at the start of operation. When the contact angle $\alpha$ is less than 35°, it is not possible to sufficiently reduce the starting torque.

Moreover, by making the ratio of the groove shoulder height h on the load side of the inner raceway of the single-row angular contact ball bearing and the diameter Bd of the balls satisfy the relationship $0.2 \leq h/Bd \leq 0.5$, it becomes difficult for the balls of the single-row angular contact ball bearing to ride up on the groove shoulder section (edge section on the end in the width direction) of the inner raceway. Therefore, it is possible to increase the life of the single-row angular contact ball bearing. In other words, when the balls ride up on the groove shoulder section, extremely large contact pressure (edge load) acts at the area of contact between the rolling surface of the balls and the groove shoulder section, and it becomes easy for the rolling surface of the balls to become damaged, and thus the life of the single-row angular contact ball bearing is decreased. However, by satisfying the relationship $0.2 \leq h/Bd \leq 0.5$, it becomes difficult for the balls to ride up on the groove shoulder section of the inner raceway as described above, and thus it is possible to lengthen the life of the single-row angular contact ball bearing.

In addition, of the ball rows of the tandem double-row angular contact ball bearing, by making the pitch-circle diameter of the ball row on the pinion gear side greater than the pitch-circle diameter of the ball row on the side opposite from the pinion gear side, and making the radial clearance of the ball row on the pinion gear side less than the radial clearance of the ball row on the side opposite from the pinion gear side, it is possible to increase the rigidity of the tandem double-row angular contact ball bearing, and it is possible to effectively prevent the occurrence of strange noise in the area of engagement between the pinion gear and the ring gear.

In other words, by making the radial clearance of the ball row on the pinion gear side, which has higher rigidity by making the pitch-circle diameter large (bearing size is large) (in addition, the rigidity can be further increased by increasing the number of balls, or by increasing the diameter of the balls), less than the radial clearance of the ball row on the side opposite from the pinion gear side, which has lower rigidity by making the pitch-circle diameter small, it is possible for the ball row on the pinion gear side having high rigidity to support a larger load than the ball row on the side opposite from the pinion gear side that has low rigidity. Therefore, it is possible to increase the rigidity of the tandem double-low angular contact ball bearing as a whole.

Furthermore, of the ball rows of the tandem double-row angular contact ball bearing, by making the diameter of the balls of the ball row on the pinion gear side greater than the diameter of the balls of the ball row on the side opposite from the pinion gear side, it is possible to prevent a decrease in the life of the ball row of the tandem double-row angular contact ball bearing that is on the pinion gear side that supports larger loads. Therefore, together with being able to increase the life of the overall double-row angular contact ball bearing, it becomes easier to perform design so that the life of the ball row on both pinion gear side is the same as the life of the ball row on the side opposite from the pinion gear side, and thus a lean design is possible.

EMBODIMENTS FOR CARRYING OUT THE INVENTION

Example 1

Figure 1:
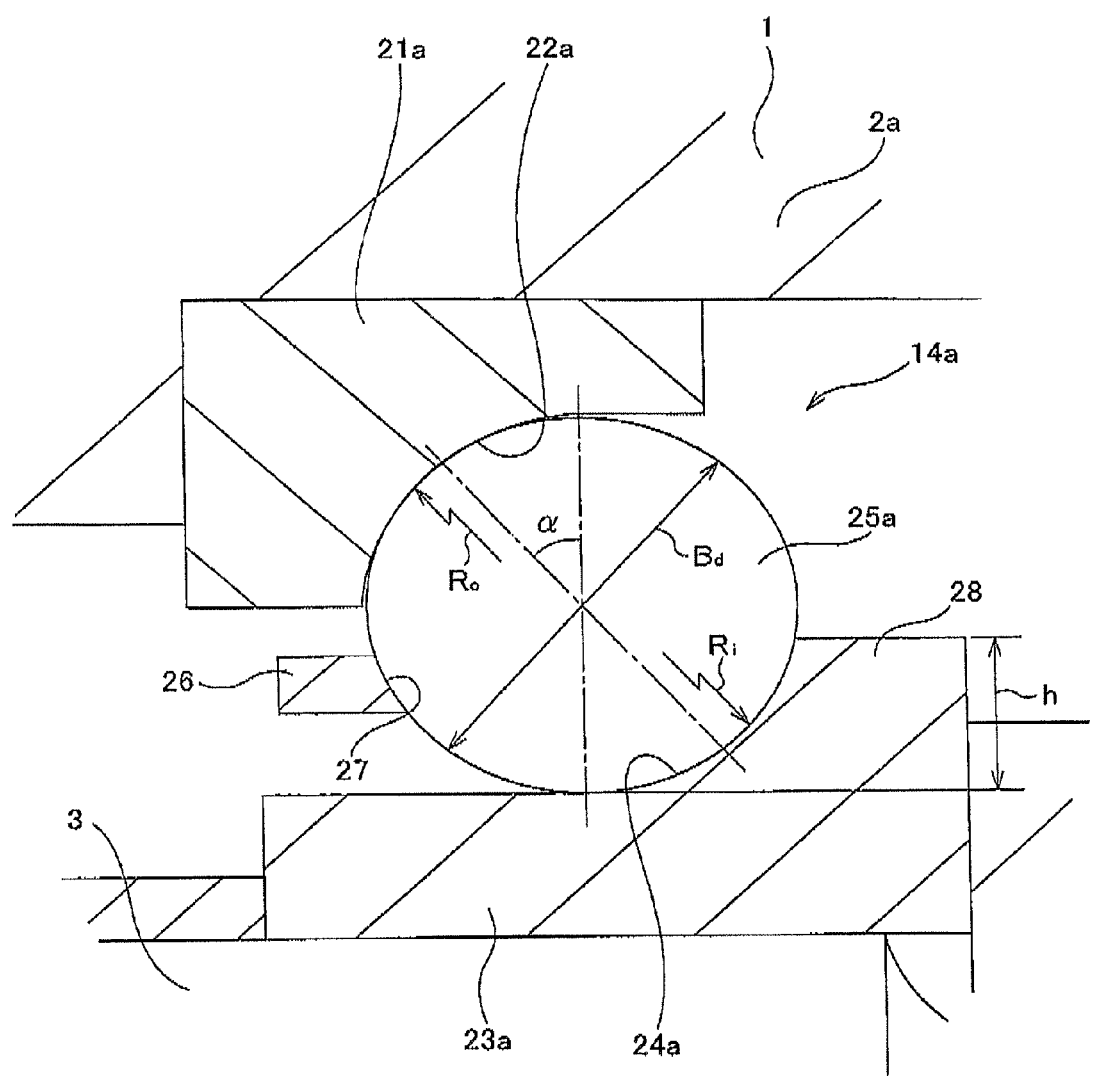
FIG. 1 is an enlarged cross-sectional view illustrating a first example of an embodiment of the present invention, and corresponds to area A in FIG. 10.
Figure 2:
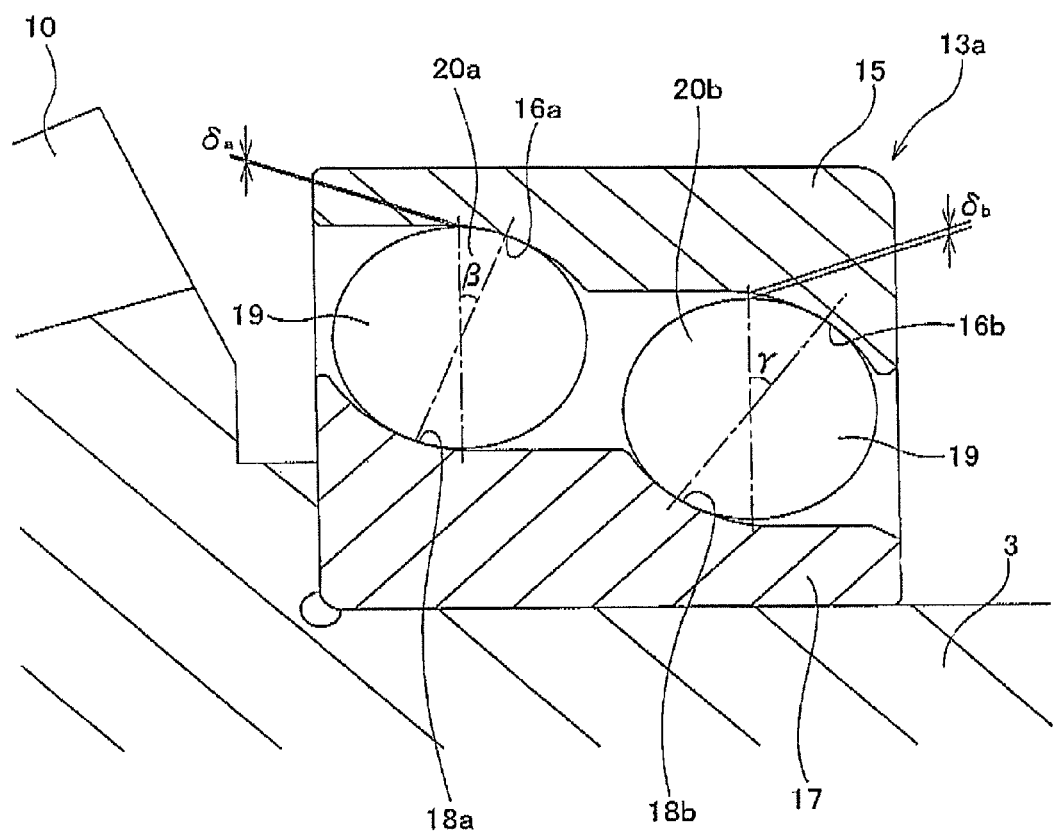
FIG. 2 is an enlarged cross-sectional view that similarly corresponds to area B in FIG. 10.
Figure 10:
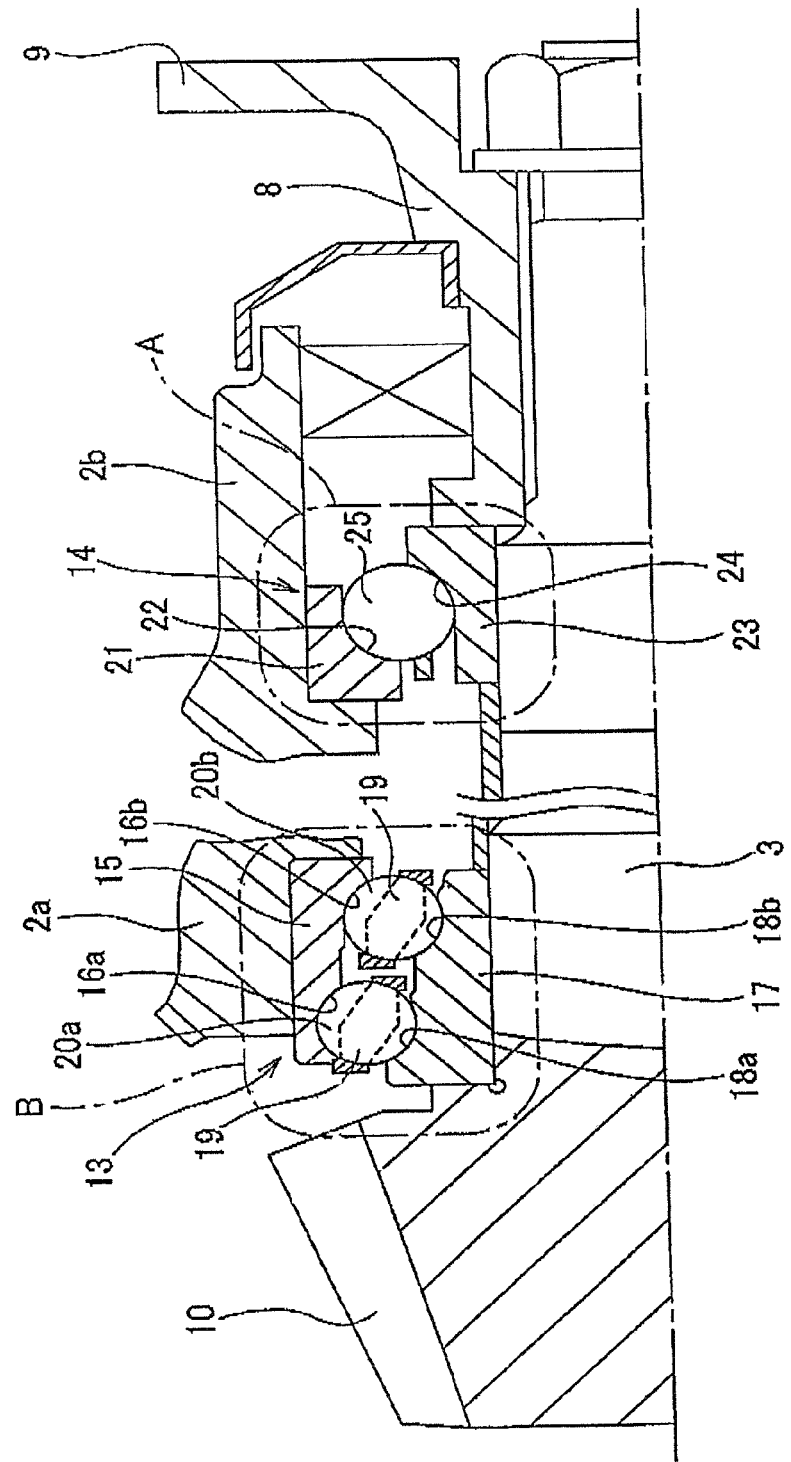
FIG. 10 is a partial cross-sectional view illustrating a second example of conventional construction of a rotation support device for a pinion shaft.

FIG. 1 and FIG. 2 illustrate a first example of an embodiment of the present invention. A feature of the rotation support device for a pinion shaft of this example is in the construction of a tandem double-row angular contact ball bearing 13a that is located on the pinion gear side and a single-row angular contact ball bearing 14a that is located on the side opposite from the pinion gear side in order to reduce the dynamic torque during operation and the starting torque at the start of operation. The other construction, functions and effects are mostly the same as those of the second example of conventional construction illustrated in FIG. 10 and described above, so drawings and explanations of identical parts are simplified or omitted, with the explanation below centering on the features of this example.

In the case of the rotation support device for a pinion shaft of this example as well, as in the case of the second example of conventional construction, a tandem double-row angular contact ball bearing 13a such as illustrated in FIG. 2 that is capable of supporting axial loads that act on the pinion shaft 3 in the direction from the pinion gear side toward the opposite side from the pinion gear side is used as the rolling bearing on the pinion gear side. On the other hand, a single-row angular contact ball bearing 14a such as illustrated in FIG. 1 that is capable of supporting axial loads that act on the pinion shaft 3 in a direction from the side opposite from the pinion gear side toward the pinion gear side is used as the rolling bearing on the side opposite from the pinion gear side.

The single-row angular contact ball bearing 14a that is located on the side opposite from the pinion gear side is such that a plurality of balls 25a are provided between an angular outer raceway 22a that is formed around the inner circumferential surface of an outer ring 21a and an angular inner raceway 24a that is formed around the outer circumferential surface of the inner ring 23a such that the balls 25a can rotate freely with a contact angle α applied. These balls 25a are supported inside a plurality of pockets 27 that are formed in a ring-shaped retainer 26, such that each ball can individually roll freely. The outer ring 21a is fastened around the inside of a ring-shaped wall 2a that is formed on the inside of the case 1, and the inner ring 23a is fastened around the outside of the middle section of the pinion shaft 3.

Particularly in the case of this example, when the radius of curvature of the outer raceway 22a (cross-sectional shape) is taken to be Ro, and the diameter of the balls 25a is taken to be Bd, the outer raceway groove R ratio, which is the ratio of the radius of curvature Ro and the diameter Bd (Ro/Bd), is regulated within the range 0.52<Ro/Bd≤0.56. Moreover, the value of the contact angle is regulated within a range of 35° to 45°.

Furthermore, in this example, the height h of the groove shoulder section 28 that is formed on the load side (opposite side from the pinion gear side) of the inner raceway 24a is regulated according to the relationship with the diameter Bd of the balls 25a. In other words, the ratio of the height h of the groove shoulder section 28 and the diameter Bd of the balls 25a (h/Bd) is regulated within the range 0.2≤h/Bd≤0.5.

On the other hand, in the tandem angular contact ball bearing 13a that is located on the pinion gear side, the size of the radial clearance between the ball rows 20a, 20b is made to differ. More specifically, as illustrated in FIG. 2, the radial clearance δa of the ball row 20a on the pinion gear side having a large pitch-circle diameter is less than the radial clearance δb of the ball row 20b on the side opposite from the pinion gear side having a small pitch-circle diameter (δa<δb). In FIG. 2, the sizes of these radial clearances δa, δb are exaggeratedly illustrated. In this example, the diameter of the balls 19 of the ball row 20a on the pinion gear side and the diameter of the balls 19 of the ball row 20b on the side opposite from the pinion gear side are made the same, and the number of balls 19 of the ball row 20a on the pinion gear side is greater than the number of balls 19 of the ball row 20b on the side opposite from the pinion gear side. Moreover, the contact angle β of the ball row 20a on the pinion gear side is less than the contact angle γ of the ball row 20b on the side opposite from the pinion gear side (β<γ).

In the case of this example, the material of the rings (outer ring 21a and inner ring 23a) of the single-row angular contact ball bearing 14a and the rings (outer ring 15 and inner ring 17) of the double-row angular contact ball bearing 13a can be bearing steel such as SUJ2 or SUJ3 (grade 2 or grade 3 high-carbon chromium bearing steel), bearing steel that has undergone carburizing or carbonitriding in order to obtain a surface-hardened layer (nitrogen-enriched layer), or an alloyed steel that is obtained by adding as necessary an alloying element such as Si, Mn, Cr, Mo or the like to a medium carbon steel such as S53C, and performing carburizing or carbonitriding. Particularly, when the rotation support device for a pinion shaft of this example is used under conditions of high-speed rotation and high temperature, it is preferred that the alloyed steel above be an alloyed steel that contains a large amount of Si in order to obtain the effect of improved temper softening resistance, and for which carburizing or carbonitriding has been performed. Moreover, it is also possible to use an iron-based alloy such as stainless steel (for example, a martensitic stainless steel), carbon steel or the like.

Furthermore, the material of the balls 25a of the single-row angular contact ball bearing 14a, and the balls 19 of the ball rows 20a, 20b of the double-row angular contact ball bearing 13a can be bearing steel such as SUJ2 or SUJ3, bearing steel that has undergone carburizing or carbonitriding, or an alloyed steel that is obtained by adding as necessary an alloying element such as Si, Mn, Cr, Mo or the like to a medium carbon steel, and performing carburizing or carbonitriding. The balls 25a, 19 could also be ceramic.

In the case of the rotation support device for a pinion shaft of this example, having construction such as described above, together with being able to sufficiently maintain bearing rigidity of a pair of rolling bearing for supporting the pinion shaft 3 so as to be able to rotate freely, it is possible to sufficiently reduce the dynamic torque during operation and the starting torque at the start of operation.

In other words, in this example, together with using a single-row angular contact ball bearing 14a as the rolling bearing on the opposite side from the pinion gear side, the outer raceway groove R ratio (Ro/Bd) of this single-row angular contact ball bearing 14a is regulated within the range 0.52<Ro/Bd≤0.56. Therefore, together with being able to make the contact area between the outer raceway 22a and the rolling surface of the balls 25a small, it is possible to prevent the amount of axial displacement from becoming excessively large. Consequently, it is possible to sufficiently maintain the axial rigidity and to reduce the dynamic torque during operation. When the outer raceway groove R ratio becomes 0.52 or less, the contact area between the outer raceway 22a and the rolling surface of the balls 25a becomes too large, and thus it becomes impossible to sufficiently reduce the dynamic torque. On the other hand, when the outer raceway groove R ratio becomes greater than 0.56, the contact area between the outer raceway 22a and the rolling surface of the balls 25a becomes too small and the contact pressure increases, so when compared with the case where the outer raceway groove R ration is 0.56, it not only becomes difficult to further reduce the dynamic torque, but the amount of axial displacement becomes large, and it becomes difficult to maintain the axial rigidity.

Figure 9:
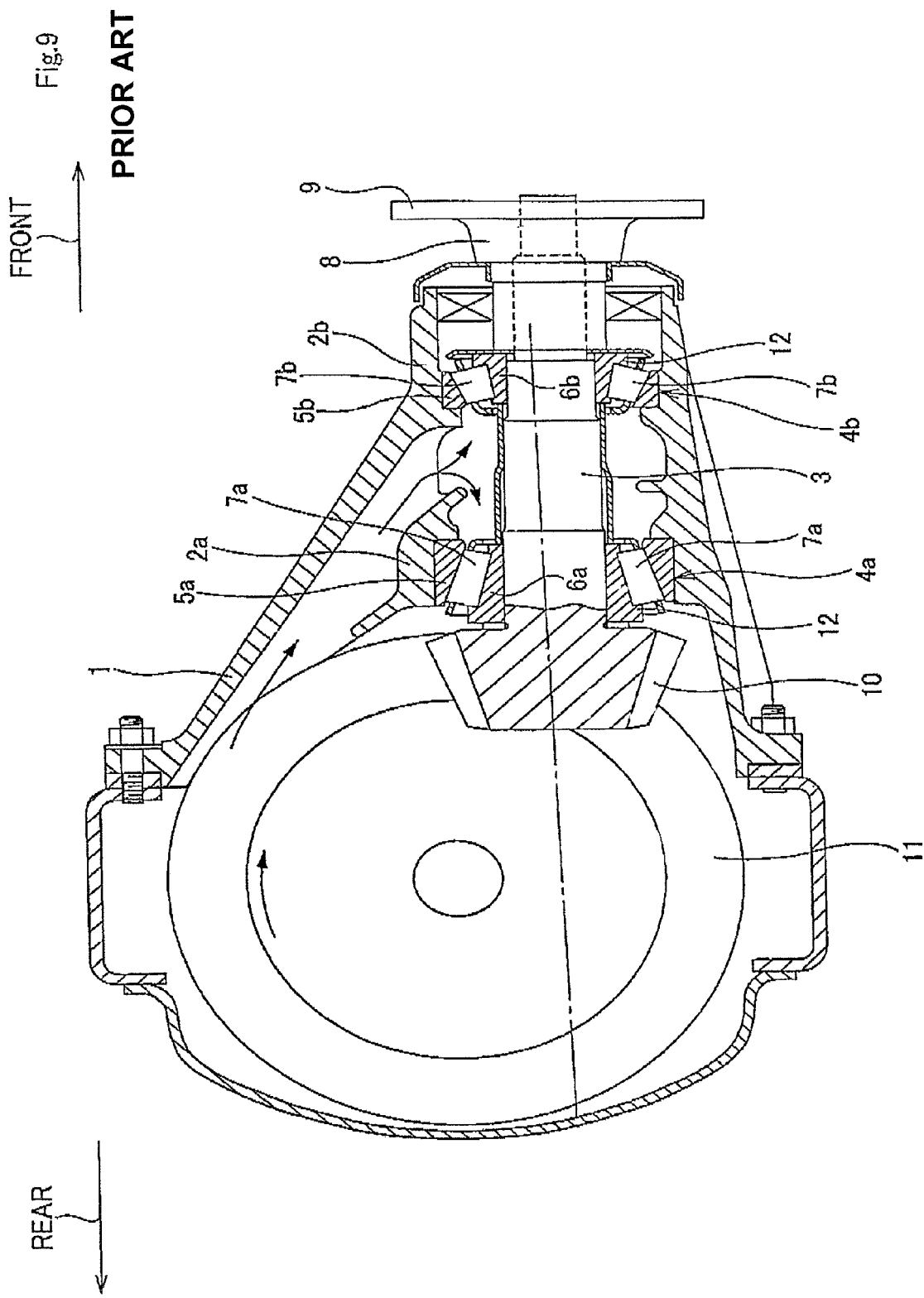
FIG. 9 is a cross-sectional view illustrating a differential device in which a first example of conventional construction of a rotation support device for a pinion shaft is assembled.

Moreover, in this example, the contact angle α of the single-row angular contact ball bearing 14a is regulated within the range 35° to 45°, so it is possible to sufficiently reduce the starting torque at the start of operation. When the contact angle α is less than 35°, it becomes impossible to sufficiently reduce the starting torque. On the other hand, when the contact angle α becomes greater than 45°, the radial rigidity is insufficient, which is disadvantageous from the aspect of preventing the occurrence of noise in the area of engagement between the pinion gear 10 and the ring gear 11 (FIG. 9).

In the case of this example, the ratio between the height h of the groove shoulder section 28 that is formed on the load side of the inner raceway 24a and the diameter Bd of the balls 25a (h/Bd) is regulated within the range 0.2 to 0.5, so it is difficult for the balls 25a to ride up on the groove shoulder section 28. Therefore, it is possible to lengthen the life of the single-row angular contact ball bearing 14a. In other words, when the balls 25a ride up on the groove shoulder section 28, very large contact pressure (edge load) acts, making it easy for the rolling surface of these balls 25a to become damaged, and thus it becomes easy for the life of the single-row angular contact ball bearing 14a to decrease. On the other hand, in the case of this example, it becomes difficult for the balls 25a to ride up on the groove shoulder section 28, so it is possible to prevent the occurrence of this edge load, and thus the life of the single-row angular contact ball bearing 14a is increased. When the value h/Bd becomes less than 0.2, it becomes impossible to sufficiently prevent the balls 25a from riding up on the shoulder section 28, and when the value h/Bd is greater than 0.5, it is not possible to further improve the effect of preventing the balls 25a from riding up on the shoulder section 28 in proportion to the increase in cost.

Furthermore, in this example, the radial clearance δa of the ball row 20a on the pinion gear side of the tandem double-row angular contact ball bearing 13a that is located on the pinion gear side is less than the radial clearance δb of the ball row 20b on the opposite side from the pinion gear side, so it is possible to increase the overall rigidity of the tandem double-row angular contact ball bearing 14a.

That is, in this example, by making the radial clearance δa of the ball row 20a on the pinion gear side, which has higher rigidity due to the larger size of the pitch-circle diameter and the larger number of balls, less than the radial clearance δb of the ball row 20b on the opposite side from the pinion gear side, which has lower rigidity due to the smaller pitch-circle diameter and smaller number of balls, it is possible for the ball row 20a on the pinion gear side, which has a higher rigidity, to support a larger load than the ball row 20b on the side opposite from the pinion gear side, which has a lower rigidity. To explain this in more detail, when a radial load is applied to the double-row angular contact ball bearing 14a, first the radial clearance δa of the ball row 20a on the pinion gear side is reduced, and the radial load is supported by one the ball row 20a on the pinion gear side. Then, when a larger radial load is applied, the radial clearance δb of the ball row 20b on the opposite side from the pinion gear side decreases and the remaining radial load is supported by the ball row 20b on the opposite side from the pinion gear side. Therefore, the ball row 20a on the pinion gear side, which has higher rigidity, supports a larger load than the ball row 20b on the side opposite from the pinion gear side, which has lower rigidity. As a result, the overall rigidity of the tandem double-row angular contact ball bearing 13a can be increased. It is also possible to effectively prevent the occurrence of strange noise in the area of engagement between the pinion gear 10 and ring gear 11 (FIG. 9).

With the rotation support device for a pinion shaft of this example described above, the rigidity of both the tandem double-row angular contact ball bearing 13a on the pinion gear side and the single-row angular contact ball bearing 14a on the side opposite from the pinion gear side is increased, so it is possible to effectively prevent the occurrence of strange noise in the area of engagement. Moreover, it is possible to sufficiently reduce the dynamic torque and starting torque of the single-row angular contact ball bearing 14a, and thus it is possible to sufficiently meet the demand for lowering the fuel consumption of the automobile.

In embodying the present invention, the size of the inner-groove R ratio, which is the ratio of the radius of curvature Ri of the inner raceway of the single-row angular contact ball bearing and the diameter of the balls Bd, is not particularly limited. However, in order to lengthen the life of the bearing by reducing the torque of the single-row angular contact ball bearing, it is possible to employ construction wherein the inner raceway groove R ratio (Ri/Bd), for example, is a little larger than the outer raceway groove R ratio (Ro/Bd) (for example, 0.53≤Ri/Bd≤0.57). The reason for making the inner raceway groove R ratio greater than the outer raceway groove R ratio is as described in the following. That is, when the contact area between the rolling surface of the balls and the outer raceway and inner raceway are the same, the contact pressure (Po) between the rolling surface of the balls and the outer raceway is greater than the contact pressure (Pi) between the rolling surface of the balls and the inner raceway due to the centrifugal force acting on the balls (Po>Pi). Therefore, it is necessary to maintain the contact area between the rolling surface of the balls and the outer raceway and reduce the contact pressure (Po) by the amount that the contact pressure (Po) increases. In other words, in order to maintain the contact area with the outer raceway, it is necessary to make the radius of curvature of the outer raceway less than the radius of curvature of the inner raceway. For this reason, the inner raceway groove R ratio can be made to be greater than the outer raceway groove R ratio.

Moreover, when embodying the present invention, the double rows of inner raceways of the tandem angular double-row ball bearing that is located on the pinion gear side can be formed directly around the outer circumferential surface of the pinion shaft. By employing this kind of construction, together with being able to make a differential device or transfer case in which the rotation support device for a pinion shaft is assembled more compact, it is possible to increase the diameter of the balls of the tandem double-row angular contact ball bearing, and thus it is possible to increase the load capacity. Moreover, it is possible to simplify the work of assembling the rotation support device for a pinion shaft.

When embodying the present invention, by making the diameter of the balls of the ball row on the pinion gear side smaller than the diameter of the balls of the ball row on the side opposite from the pinion gear side, the number of balls of the ball row on the pinion gear side is sufficiently greater than the number of balls of the ball row on the side opposite from the pinion gear side, and thus it is possible to make the rigidity of the ball row on the pinion gear side significantly greater than the rigidity of the ball row on the side opposite from the pinion gear side.

Example 2

Figure 3:
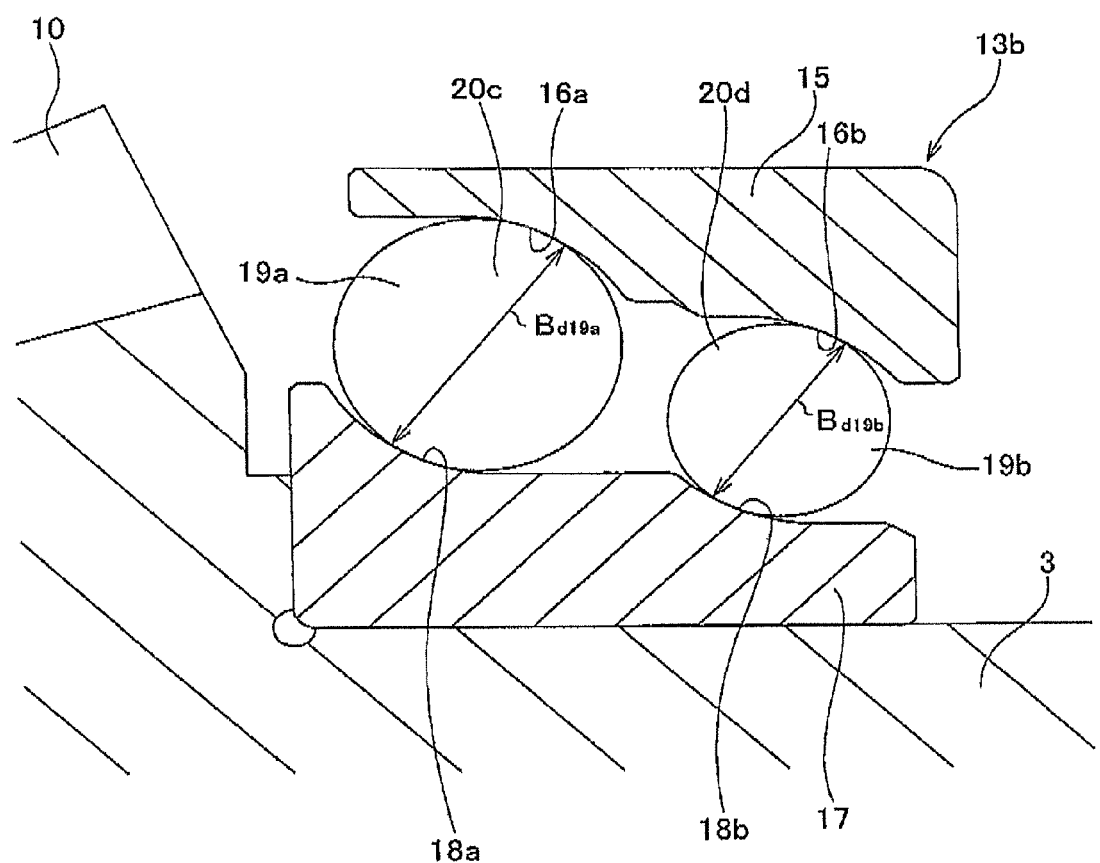
FIG. 3 illustrates a second example of an embodiment of the present invention, and corresponds to FIG. 2.

FIG. 3 illustrates a second example of an embodiment of the present invention. A feature of this example is that diameters of the balls 19a, 19b of the respective ball rows 20c, 20d of the tandem double-row angular contact ball bearing 13b that is located on the pinion gear side are different from each other. In other words, in this example, of the ball rows 20c, 20d, the diameter ($Bd_{19a}$) of the balls 19a of the ball row 20c on the pinion gear side (left side in FIG. 3) is greater than the diameter ($Bd_{19b}$) of the balls 19b of the ball row 20d on the side opposite from the pinion gear side (right side in FIG. 3). More specifically, the diameter ($Bd_{19a}$) of the balls 19a on the pinion gear side is 1.01 to 1.5 times greater than the diameter ($Bd_{19b}$) of the balls 19b on the side opposite from the pinion gear side. In this example, the number of balls of the ball rows on the pinion gear side and the side opposite from the pinion gear side corresponds to the ratio of the diameter ($Bd_{19a}$) of the balls 19a on the pinion gear side and the diameter ($Bd_{19b}$) of the balls 19b on the side opposite from the pinion gear side, and corresponds to the ratio of the pitch-circle diameter of the ball row 20c on the pinion gear side and the pitch-circle diameter of the ball row 20d on the side opposite from the pinion gear side.

In the case of this example having construction as described above, of the ball rows 20c, 20d of the double-row angular contact ball bearing 13b, it is possible to increase the load capacity of the ball row 20c on the pinion gear side that supports a larger load. Therefore, it is possible to prevent a decrease in the life of the ball row 20c. Consequently, together with being able to lengthen the overall life of the double-row angular contact ball bearing 13b, designing the ball row 20c on the pinion gear side and the ball row 20d on the side opposite from the pinion gear side so that the life of each ball row is nearly the same becomes easier, and thus a lean design is possible.

The other construction and functions are the same as in the case of the first example of the embodiment described above.

[Testing]

Figure 4:
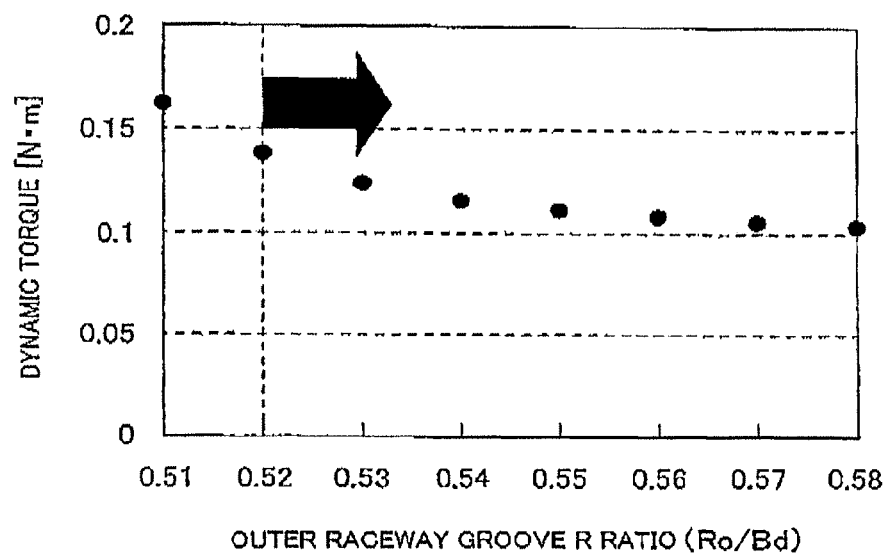
FIG. 4 is a diagram illustrating the test results of a test that was performed to confirm the effect of the present invention, and illustrates the relationship between the outer raceway groove R ratio and the dynamic torque.

Next, testing that was performed to confirm the effect of the present invention will be explained with reference to FIG. 4 to FIG. 8. First, testing that was performed to find the relationship between the outer raceway groove R ratio (Ro/Bd) and the dynamic torque will be explained. The testing was performed using eight samples of which the outer raceway groove R ratios differed within the range 0.51 to 0.58 (the contact angle was 40° in each sample), and testing of each sample was performed under a condition of forced lubrication using mineral oil having a supplied oil temperature of 80° C. (with viscosity at 40° C. being 73 $mm^2$/sec). An axial load (2770 N) was applied to each sample, and the rotation speed of the inner ring was 3000 $min^{-1}$. FIG. 4 illustrates the results of the testing that was performed in this way. As can be clearly seen from the test results illustrated in FIG. 4, when the value of the outer raceway groove R ratio was greater than 0.52, the dynamic torque became sufficiently low.

Figure 5:
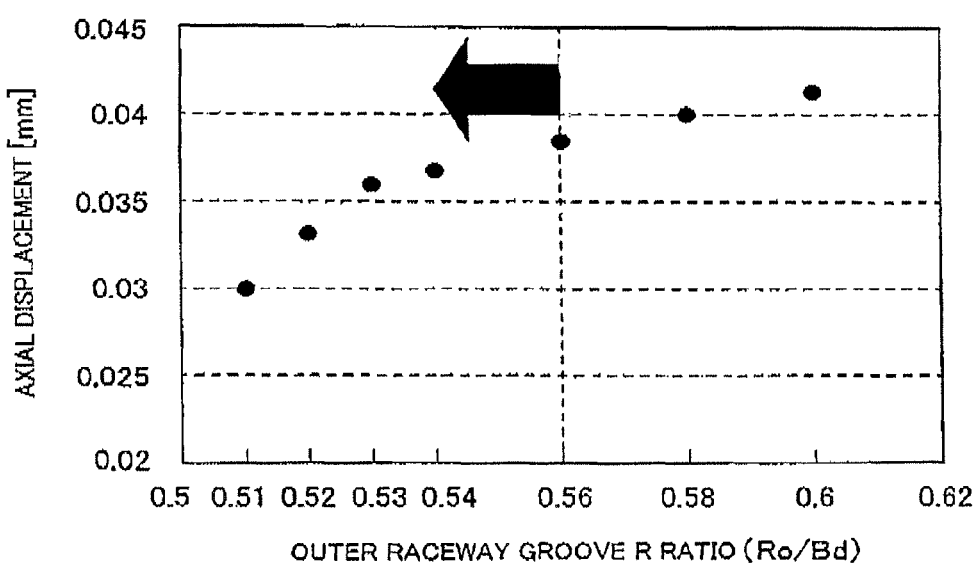
FIG. 5 is a diagram that similarly illustrates the relationship between the outer raceway groove R ratio and the amount of axial displacement.

Next, testing that was performed to find the relationship between the outer raceway groove R ratio (Ro/Bd) and the amount of axial displacement is explained. Testing was performed using seven samples of which the value of the outer raceway groove R ratios differed within a range from 0.51 to 0.6 (there were 12 balls in each sample, and the initial contact angle in each sample was 40°), and the amount of axial displacement was measured when an axial load (10 kN) was applied to each sample. FIG. 5 illustrates the results of the testing performed in this way. As can be clearly seen from the test results illustrated in FIG. 5, when the outer raceway groove R ratio was 0.56 or less, the amount of axial displacement was sufficiently small.

Figure 6:
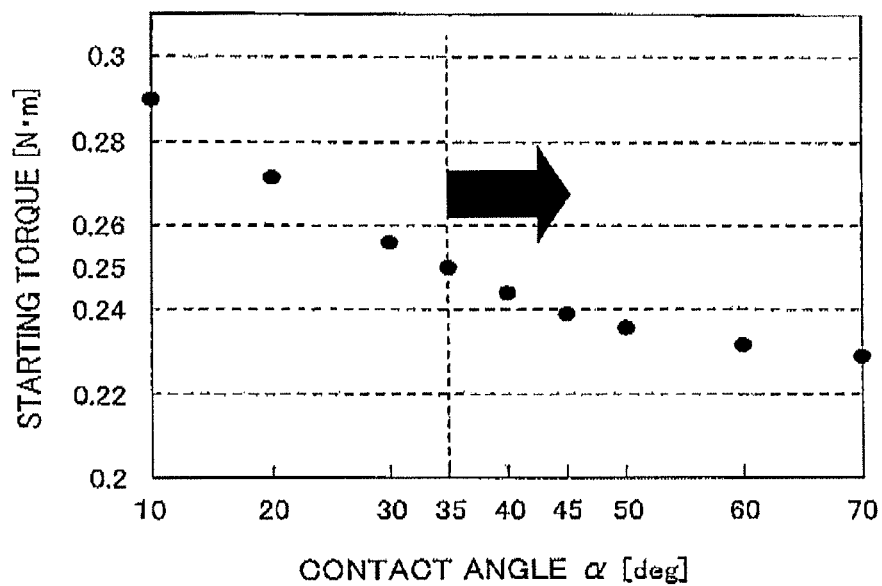
FIG. 6 is a diagram that similarly illustrates the relationship between the contact angle α and the starting torque.

Next, testing that was performed to find the relationship between the contact angle α and the starting torque will be explained. Testing was performed using nine samples of which the contact angle differed within a range from 10° to 70° (the number of balls in each sample was 12, and the outer raceway groove R ratio of each sample was 0.55), and the starting torque was measured with a preload (2770 N) applied to each sample. FIG. 6 illustrates the results of testing that was performed in this way. As can be clearly seen from the test results illustrated in FIG. 6, when the value of the contact angle α was set to be 35° or greater, the starting torque was sufficiently low.

Figure 7:
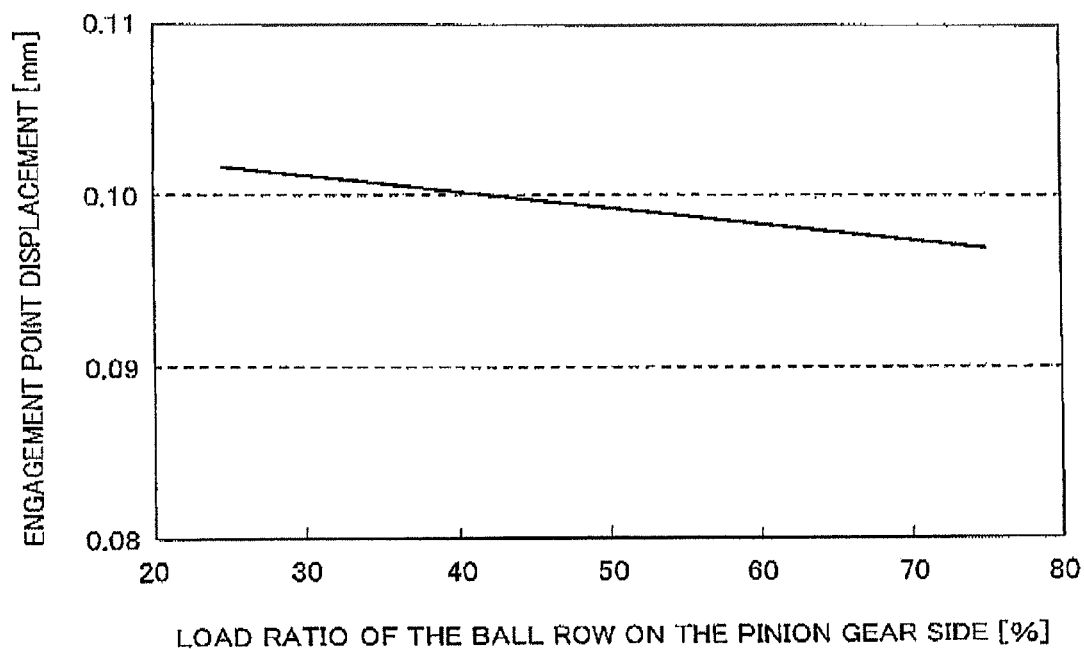
FIG. 7 is a diagram that similarly illustrates the relationship between the load ratio of the ball row on the pinion gear side of the double-row angular contact ball bearing and the displacement at the point of engagement with the pinion gear.

Next, testing that was performed in order to confirm that the overall rigidity of the double-row ball bearing could be increased by making the radial clearance of the ball row on the pinion gear side less than the radial clearance of the ball row on the side opposite from the pinion gear side will be explained. Testing was performed by changing the load ratio of the load supported by the ball row on the pinion gear side within a range from 25% to 75%, and finding the amount of displacement at the point of engagement with the pinion gear at each ratio. FIG. 7 illustrates the results of testing that was performed in this way. As can be clearly seen from the test results illustrated in FIG. 7, the amount of displacement at the point of engagement was smaller the greater the load ratio of the load supported by the ball row on the pinion gear side was (further toward the right side in FIG. 7). In other words, it was confirmed that the rigidity of the tandem double-row angular contact ball bearing was increased.

Finally, testing was performed in order to know the effect that the diameter of the balls of each ball row (when the diameters of the balls in the ball rows are the same or different) of the tandem double-row angular contact ball bearing and the material of the balls have on the bearing life. Testing was performed to evaluate the life of the bearing under the conditions described below using a tandem double-row angular contact ball bearing (bearing for comparison) of which the outer diameter of the outer ring was 105.25 mm, the inner diameter of the inner ring was 45 mm, the balls of both rows were made of SUJ2 (grade 2 high-carbon chromium bearing steel) and had a diameter of 15.081 mm, the number of balls on the pinion gear side and on the side opposite from the pinion gear side were 15 and 13, respectively, and the contact angles were 30° and 40°, respectively; a tandem double-row angular contact ball bearing (test bearing 1) of which the diameter of the balls of the ball row on the pinion gear side was 18.256 mm, the diameter of the balls of the ball row on the side opposite from the pinion gear side was 12.7 mm, the number of balls on the pinion gear side and side opposite from the pinion gear side was 12 and 14, respectively, and the contact angles were 30° and 40°, respectively, and other specifications such as the other bearing sizes except for pitch-circle diameters and distance between rows were the same as that of the bearing for comparison described above; and a tandem double-row angular contact ball bearing (test bearing 2) that was the same as test bearing 2 except that the material of the balls was SUJ3 (grade 3 high-carbon chromium bearing steel) for which carbonitriding was performed. The balls of the double-row angular contact ball bearing of test bearing 2 underwent carbonitriding for 5 to 20 hours at 830° C., after which heat treatment (annealing) was performed at 180 to 270° C.

[Test Conditions]
Radial load: 2.5 kN
Axial load: 2.9 kN
RPM: 3000 min$^{-1}$
Lubricant: Differential oil VG73 (permissible substitute)

Figure 8:
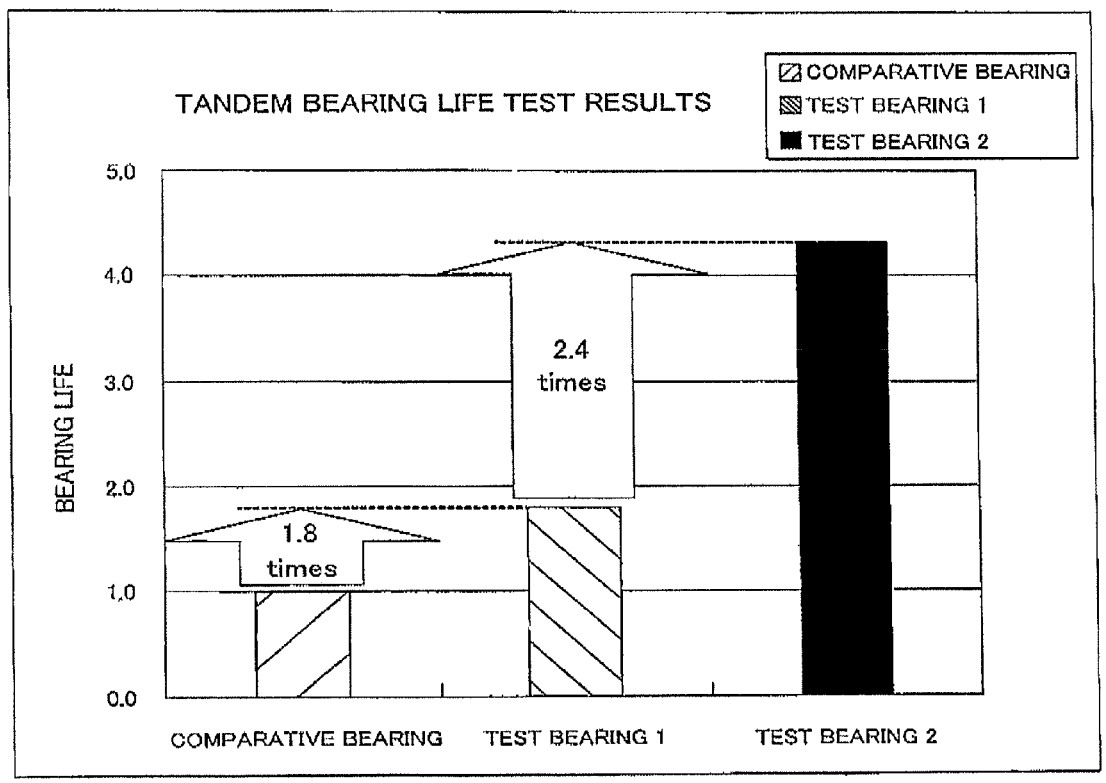
FIG. 8 is a diagram that illustrates the test results of a test that was performed in order to know the effect that the diameter and material of the balls of both ball rows of a double-row angular contact ball bearing having on the life of the bearing.

FIG. 8 illustrates the results of testing that is performed in this way. As can be clearly seen from the test results illustrated in FIG. 8, in the case of the double-row angular contact ball bearing of test bearing 1 in which the diameter of the balls of the ball row on the pinion gear side is greater than the diameter of the balls of the ball row that is on the side opposite from the pinion gear side, it was confirmed that the life of the bearing was 1.8 times longer than in the case of the double-row angular contact ball bearing of the bearing for comparison in which the diameter of the balls in both ball rows is the same. This is considered to be because the load capacity of the ball row on the pinion side that supports a larger load larger than the ball row on the side opposite from the pinion gear side could be increased. Furthermore, in the case of the double-row angular contact ball bearing of test bearing 2 that used balls made of SUJ3 and that underwent carbonitriding, it could be confirmed that the life of the bearing was 2.4 times longer than the double-row angular contact ball bearing of test bearing 1 that used balls that did not undergo carbonitriding. This is thought to be because of the longer life of the balls due to a hardened layer is formed on the surface of the layer of the balls by performing carbonitriding, making it more difficult for damage such as scratches or indentations to occur.

EXPLANATION OF REFERENCE NUMBERS

1 Case
2a, 2b Ring-shaped wall
3 Pinion shaft
4a, 4b Single-row tapered roller bearing
5a, 5b Outer ring
6a, 6b Inner ring
7a, 7b Tapered roller
8 Connecting member
9 Connecting flange
10 Pinion gear
11 Ring gear
12 Rib section
13, 13a, 13b Double-row angular contact ball bearing
14, 14a Single-row angular contact ball bearing
15 Outer ring
16a, 16b Outer raceway
17 Inner ring
18a, 18b Inner raceway
19, 19a, 19b Ball
20a, 20b, 20c, 20d Ball row
21 Outer ring
22 Outer raceway
23 Inner ring
24 Inner raceway
25 Ball
26 Retainer
27 Pocket
28 Groove shoulder section

What is claimed is:

1. A rotation support device for a pinion shaft that supports the pinion shaft with a pinion gear provided on one end, inside a housing, comprising:
   a pair of rolling bearings for supporting the pinion shaft that are separated from each other in the axial direction such that the pinion shaft can rotate freely and can support an axial load from both directions;
   wherein:
   the rolling bearing on the pinion gear side is a tandem double-row angular contact ball bearing that is capable of supporting an axial load that acts on the pinion shaft in a direction from the pinion gear side to the side opposite from the pinion gear side, and
   the rolling bearing on the side opposite from the pinion gear side is a single-row angular contact ball bearing that is capable of supporting an axial load that acts on the pinion shaft in a direction from the side opposite from the pinion gear side to the pinion gear side;
   when the radius of curvature of the outer raceway of this single-row angular contact ball bearing is taken to be Ro, the diameter of the balls is taken to be Bd, and the contact angle between the outer raceway and inner raceway and the balls is taken to be α, the relationships $0.52 < Ro/Bd \leq 0.56$ and $35° \leq \alpha$ being satisfied; and
   of both ball rows of the tandem double-row angular contact ball bearing,
   the pitch-circle diameter of the ball row on the pinion gear side is larger than the pitch-circle diameter of the ball row on the side opposite from the pinion gear side, and the radial clearance of the ball row on the pinion gear side is less than the radial clearance of the ball row on the side opposite from the pinion gear side.

2. The rotation support device for a pinion shaft according to claim 1, wherein
when the height of the groove shoulder on the load side of the inner raceway of the single-row angular contact ball bearing is taken to be h, the relationship $$0.2 \leq h/Bd \leq 0.5$$

is satisfied.

3. The rotation support device for a pinion shaft according to claim 1, wherein
of both ball rows of the tandem double-row angular contact ball bearing,
the number of balls in the ball row on the pinion gear side is greater than the number of balls in the ball row on the side opposite from the pinion gear side.

4. The rotation support device for a pinion shaft according to claim 1, wherein
of both ball rows of the tandem double-row angular contact ball bearing,
the diameter of the balls in the ball row on the pinion gear side is greater than the diameter of the balls in the ball row on the side opposite from the pinion gear side.

* * * * *